United States Patent [19]

Giovanelli et al.

[11] 3,976,820
[45] Aug. 24, 1976

[54] PROCESS FOR THE PRODUCTION OF PILE SURFACED ARTICLES

[75] Inventors: Anton Alfred Arthür Giovanelli, Oestringen; Eckhard Wolfgang Schmidt, Bad Schonborn, both of Germany

[73] Assignee: Imperial Chemical Industries Limited, London, England

[22] Filed: Jan. 31, 1975

[21] Appl. No.: 546,146

[30] Foreign Application Priority Data
Feb. 4, 1974 United Kingdom............... 5021/74

[52] U.S. Cl................................ 428/85; 156/72; 264/164; 264/280; 264/284; 428/91; 428/92
[51] Int. Cl.²........................................ B29C 17/02
[58] Field of Search............ 428/85, 91, 92; 264/47, 264/88, 164, 167, 171, 175, 243, 280, 284, 335; 156/72, 167, 230, 238, 277, 247, 323

[56] References Cited
UNITED STATES PATENTS

| 3,450,585 | 6/1969 | Takagi | 156/242 |
|---|---|---|---|
| 3,696,183 | 10/1972 | Steel | 264/164 |
| 3,708,565 | 1/1973 | Seiffert | 264/88 |
| 3,809,734 | 5/1974 | Watanabe | 428/85 |
| 3,814,791 | 6/1974 | Jones | 264/164 |
| 3,814,791 | 6/1974 | Jones | 264/284 |
| 3,870,778 | 3/1975 | Steel | 264/164 |

*Primary Examiner*—Marion E. McCamish
*Attorney, Agent, or Firm*—Cushman, Darby & Cushman

[57] ABSTRACT

A pile-surfaced product is made by feeding a synthetic polymeric material and a backing web to a surface with the synthetic polymeric material between the backing web and the surface under conditions where the polymeric material is filament forming and the polymeric material adheres to the surface and bonds to the backing web, then withdrawing the backing web from that surface so that as the backing web is so withdrawn the synthetic polymeric material adheres thereto and is drawn into fibrils due to its adhesion to the surface but the fibrils remain integral with the remainder of the polymeric material which is laminated to the backing web, rendering the polymeric material non-filament forming, separating the fibrils from the surface and subsequently separating the pilous synthetic polymeric layer from the backing web.

12 Claims, No Drawings

PROCESS FOR THE PRODUCTION OF PILE SURFACED ARTICLES

The present invention relates to the production of pile surfaced articles.

It has already been proposed to produce a pile on the surface of a synthetic polymeric material by pressing the material against a heated surface, preferably a heated roll, and separating the material from the surface while cooling the material to below its softening point. In this way fibrils are drawn out from the surface of the sheet and the cooling action ensures that the major part of each fibril remains integral with the polymeric material. In the preferred mode of operation of this technique the polymeric material is a thermoplastic and cold air or another cooling medium is blown into the nip formed between the heated roll and the thermoplastic material as the thermoplastic separates from the roll. In this type of process it has also been proposed to feed the thermoplastic to the roll together with a backing web with the thermoplastic between the heated roll and the backing so that the thermoplastic softens and one side bonds to the backing web under the influence of the heated roll whilst the fibrils are drawn out from the other side of the thermoplastic. In a further process it has been proposed to produce a pile on a backing by drawing fibrils through a perforated screen such as, for example, a loosely woven cotton followed by stiffening of the screen. These techniques produce laminar material consisting of the pilous synthetic polymeric material bonded to the backing.

We have however forseen the need for light weight pilous fabrics and have found that under certain conditions these may be obtained by a modification of the process described above. The present invention is therefore concerned with such light weight pilous fabrics and a method for their production. In one embodiment our invention is aimed at the production of fabrics which may be laminated to a substrate to form a vacuum formable pile surfaced laminate.

The present invention therefore provides an unsupported sheet of thermoplastic material having a pile on one side thereof the pile comprising fibres or fibrils of the thermoplastic which have been drawn out from the thermoplastic but remain integral therewith.

Any synthetic thermoplastic material may be used to form the pile surface sheets of our invention. Examples of suitable materials include polyolefines, particularly high and low density polyethylene, polypropylene and olefines copolymers, polymers and copolymers of vinyl chloride, polymers and copolymers of styrene, polyesters and the various nylons. The choice of material will, of course, depend on the particular type of product that is required and the use to which it is to be put.

The pile is formed on one side only of the thermoplastic material and consists of fibrils which are of the thermoplastic material and have been drawn out therefrom and are integral therewith. The preferred length and density of the fibrils depends upon the use to which the product is to be put but our preferred products particularly for lamination to substrates for subsequent vacuum forming have fibrils of length in the range 0.5 to 8 millimeters. Another use of our product is in the production of bags or sacks in which the pile forms the outside of the bag or sack so that the bags may be stacked on top of each other without slipping. One particularly useful method to obtain a sack forming material is to use a thick sheet of thermoplastic such as normal sacking material and to convert only part of the cross section of the sheet to the pile.

The present invention also provides a process for the production of pile surfaced synthetic materials comprising feeding a synthetic polymeric material and a backing web to a surface with the synthetic polymeric material between the backing web and the surface under conditions where the polymeric material is filament forming and the polymeric material adheres to the surface and bonds to the backing web, then withdrawing the backing web from that surface so that as the backing web is so withdrawn the synthetic polymeric material adheres thereto and is drawn into fibrils due to its adhesion to the surface but the fibrils remain integral with the remainder of the polymeric material which is laminated to the backing web subsequently rendering the polymeric material non-filament forming and separating the pilous synthetic polymeric layer from the backing web.

In our preferred process the synthetic polymeric material is a thermoplastic which can be brought to filament forming condition by heating and the surface is a heated surface preferably a heated roller. The surface may be smooth, roughened or formed with cavities to define fibre formation. In our preferred process we use a substantially smooth roller which is heated internally to a temperature above the melting point of the thermoplastic. It is to be understood that the term substantially smooth includes surfaces which have a satin finish or have been shot or sand blasted, and examples of such surfaces include polished metal surfaces such as steel or chrome and satin finish metal rolls and sand blasted metal rolls and the rolls may be coated with non-stick materials such as polytetrafluoroethylene.

The backing web serves as a carrier for the synthetic polymeric material and is necessary to support the material while it is in its filament forming condition. In addition the backing holds the material against the surface; the synthetic polymeric material may be laminated to the backing before it is fed to the heated surface or may be fed separately to the heated surface and laminated to the backing under the conditions of our process. Alternatively, if the material is thermoplastic it may be applied as powder or granules to a backing web which carries the material into contact with the heated surface where it is fused into a substantially continuous layer. We prefer that the backing web have as smooth a surface as possible to facilitate separation from the pilous material. The backing web may be for example in the form of a film or smooth sheet or smooth porous material such as knitted nylon, woven glass mat and metal gauze. The backing web may be in the form of a continous belt to which the synthetic material adheres during the fibril forming process but which is separated from the pilous synthetic material after pile formation. Alternatively, the backing web may remain weakly adherent to the pilous synthetic material and the two rolled up together and separated later when used, in this way the backing acts to protect the pilous material during transportation.

The backing web may act as the sole device which holds the synthetic polymeric material against the surface or additional means such as a belt and/or roller may be provided. Where an additional means such as a roller or a belt is used to urge both the backing web and the polymeric material against the surface another important requirement is that the backing web should not stick to this additional means. In a preferred process where the polymeric material is a thermoplastic particularly polyethylene we use a cooled roller as an additional backing means. Whichever embodiment is used the choice of backing web is most important and depends upon the nature of the synthetic polymeric material. Where the backing web itself acts to hold the polymeric material against the surface the important criteria is that the backing web should adhere more firmly to the polymeric material during the fibril forming step of our process than does the polymeric material to the surface. However, the adhesion between the polymeric material and the backing should not be so great once fibril formation is completed and the polymeric material has been rendered non-fibril forming that the backing and the pilous polymeric material cannot be separated.

We have found that one particularly suitable technique to achieve the required degree of adhesion is to use a synthetic polymeric material and a backing web which adhere when hot but adhere less strongly when cold for example the synthetic material may be polyethylene and the backing polyester film. Alternatively, a coating may be applied between the synthetic polymeric material and the backing web which is such that it allows the pilous polymeric material to be separated from the backing web once it has been rendered non-filament forming whilst allowing sufficient adhesion between the polymeric material and the backing during the fibril forming step. The choice of coating material will depend upon the nature of the backing web and the polymeric material, but we have found that when the polymeric material is a polyolefine and the backing web is cardboard a polyester or polyvinyl chloride coating on the cardboard is particularly suitable, similarly, a polyethylene coating may be used on the backing when the pile is to be formed from polyvinyl chloride. In a further embodiment, a soluble (e.g. water soluble) adhesive, for example gum arabic, may be used to anchor the polymeric material to the backing. Alternatively, a combination of suitable polymers and coating may be used and we have had particularly useful results applying a coating of water between the synthetic material and the backing, particularly between polyethylene and a polyester backing. In a further embodiment a conventional detergent may be included in the aqueous coating. If a coating is used in a continuous process the coating may be applied by passing the backing web over a coating roller or in contact with a felt applicator.

When forming fibrils from thermoplastic materials by pressing the thermoplastic against a heated roll we prefer to cool the fibrils as they are formed since this helps to ensure that the fibrils which are drawn out from the sheet remain adhering to the thermoplastic and do not stick permanently to the heated surface. In addition it is important to have cooling to allow the process to be operated at increased speeds, the greater the speed used the greater the cooling needed for the production of any particular type of pile. The cooling also helps to render the synthetic polymeric material non-filament forming. Our preferred method of cooling is to use a jet of cold air which flows into the nip formed between the heated surface and the material as it moves away from the surface, cooling should be uniform and thus the jet should extend across the total width of this nip.

We have found the actual direction of the jet of cold air is important and it is also important to allow as free a circulation of the air as possible in the space between the heated surface and the material. We therefore prefer that the cooling air be directed from a narrow slit orifice of width less than 1, preferably less than ½ millimeter under a comparatively high pressure against the heated surface at a position just beyond the point where the pile separates from the surface in such a way that the jet is deflected by the surface into this space. The combination of the position and direction of the cooling jet and the path the material takes as it moves away from the roll to a large extent determine the type of pile that can be obtained at any particular operating speed as is described in our German Pat. No. 2,359,565 whose content is included herein as describing our preferred pile forming process when using thermoplastic materials.

The thermoplastic material may also be cooled from the side furthest away from the heated surface which allows increased production speeds. Thus, in one embodiment of the process of this invention the material is hauled away from the heated surface over a suitably shaped cooled bar.

Examples of polymeric materials which may be used in our process include thermoplastic and thermosetting polymers. Where thermosetting materials are used pile formation may conveniently be achieved by techniques such as those described in our German application Offenlegungschrift No. 2221087. We do however prefer to use thermoplastic materials and to use fibril forming techniques such as those described in our German application Offenlegungschrift No. 2359565. Examples of suitable thermoplastic materials include polyolefines, particularly high and low density polyethylene, polypropylene and olefine copolymers, polymers an copolymers of vinyl chloride, polymers and copolymers of styrene, polyesters such as polyethylene terephthalate and the various nylons.

Many of the products of our invention have a pleasing appearance and may be used in decorative applications. For example, they may be laminated to a vacuum formable substrate such as polystyrene and formed into, for example, decorative trays such as those used in soap and cosmetic boxes. The products are also self-supporting and as already mentioned may be converted into sacks in which for instance thicker sheets of the synthetic polymeric material are normally used as the starting material.

The present invention is illustrated but in no way limited by the following examples.

EXAMPLE 1

A continuously moving film of low density polyethylene of thickness 63 microns was fed at a speed of 0.4 meters/minute into contact with the surface of a rotating metal roll held at a temperature of 150° C. A film of biaxially oriented polyethylene terephthalate film was fed as a backing web to hold the polyethylene film against the heated roll, the polyethylene terephthalate film was withdrawn from the heated roll over an internally cooled rod and cold air was blown into the nip formed between the polyethylene and the heated roll as the polyethylene moved away from the roll.

The polyethylene adhered to the polyethylene terephthalate as it passed around the heated roll and was withdrawn with the polyethylene terephthalate film but was also drawn into fibrils as it moved away from the heated roll due to its adhesion thereto. Once the laminate of polyethylene and polyethylene terephthalate had cooled the pilous polyethylene sheet was readily separated from the polyethylene terephthalate to produce an attractive light weight unsupported pilous polyethylene sheet.

EXAMPLE 2

The process of Example 1 was repeated using a 126 micron thick polyethylene film and applying a thin layer of water to the surface of the polyethylene terephthalate in contact with the polyethylene. A similar product to that of Example 1 with a slightly longer pile was obtained and it was found that the pilous polyethylene could be separated from the polyethylene terephthalate more easily than in Example 1.

EXAMPLE 3

Example 2 was repeated including a conventional detergent in the water. The product obtained was identical with that of Example 2 although separation of the polyethylene and the polyethylene terephthalate was even easier than in Example 2.

EXAMPLE 4

A film of polyvinyl chloride 100 microns thick was fed at a speed of 1 meter per minute into contact with a metal surface laminate air held at 200° C. A web knitted from nylon fibres and laminated to a polyethylene web 50 microns thick was fed as a backing web with the polyethylene against the polyvinyl chloride film to hold it against the metal surface. The laminatae of polyvinyl chloride and the backing web so formed was withdrawn from the heated surface over an internally cooled rod and cold ari was blown into the nip formed between the polyvinyl chloride and the heated surface as the polyvinyl chloride moved away from the surface. The polyvinyl chloride adhered to the polyethylene while hot, and was drawn into fibrils but could be separated from the polyethylene when cooled after fibril formation to yield an unsupported pile surfaced polyvinyl chloride web.

We claim:

1. A process for the production of pile surfaced synthetic materials comprising feeding a synthetic polymeric thermoplastic material and a backing web to a surface heated with the thermoplastic synthetic polymeric material between the backing web and the surface under conditions where the polymeric material is filament forming and the polymeric material adheres to the surface and bonds to the backing web, then withdrawing the backing web from that surface so that as the backing web is so withdrawn the synthetic polymeric material adheres thereto and is drawn into fibrils due to its adhesion to the surface but the fibrils remain integral with the remainder of the polymeric material which is laminated to the backing web, rendering the polymeric material non-filament forming by cooling, separating the fibrils from the surface and subsequently separating the pilous synthetic polymeric layer from the backing web.

2. A process as in claim 1 wherein said surface is substantially smooth.

3. A process according to claim 1 in which the surface is a heated surface and the synthetic polymeric material and the backing web are such that they adhere when hot but adhere less strongly when cold.

4. A process according to claim 3 in which the backing web is polyethylene terephthalate and the synthetic material is polyethylene.

5. A process according to claim 3 in which the backing web is polyvinyl chloride and the synthetic material is polyethylene.

6. A process according to claim 3 in which the backing web is polyethylene and the synthetic material is polyvinyl chloride.

7. A process according to claim 1 in which a coating is applied between the synthetic material and the backing web which allows the material to bond to the backing web when hot and to be separated from the backing when cold.

8. A process according to claim 7 in which the coating is water.

9. A process according to claim 7 in which the coating is water containing a detergent.

10. A process according to claim 1 which includes a subsequent step of laminating the separated pilous synthetic polymeric layer onto a vacuum formable substrate.

11. A process according to claim 19 in which the vacuum formable substrate is polystyrene.

12. An unsupported sheet of thermoplastic material, made by the process of claim 2, having a pile on one side thereof, the pile comprising fibres of fibrils of the thermoplastic which have been drawn out from the thermoplastic but remain integral therewith.

* * * * *

UNITED STATES PATENT OFFICE
CERTIFICATE OF CORRECTION

Patent No. 3,976,820  Dated  August 24, 1976

Inventor(s) Anton Alfred Arthur Giovanelli and Eckhard Wolfgang Schmidt

It is certified that error appears in the above-identified patent and that said Letters Patent are hereby corrected as shown below:

Claim 1, line 4 "surface heated" should read --heated surface--

Claim 11, line 1 "claim 19" should read --claim 10--

Signed and Sealed this

First Day of February 1977

[SEAL]

Attest:

RUTH C. MASON
Attesting Officer

C. MARSHALL DANN
Commissioner of Patents and Trademarks